July 13, 1965  B. S. BENSON  3,194,133
AUTOMATIC IRIS CONTROL BY CAMERA FILM MAGAZINE
Filed June 27, 1962
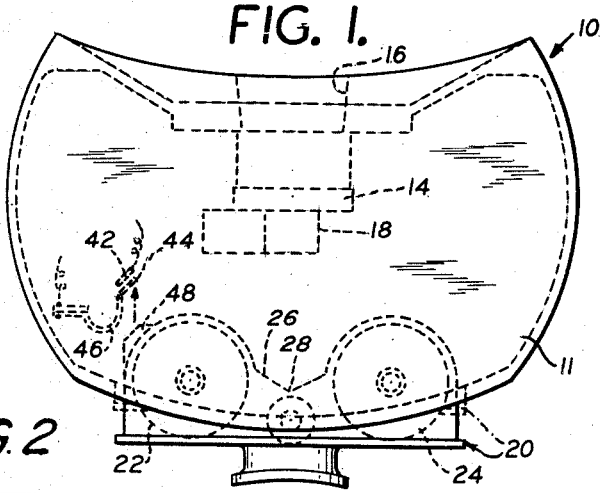
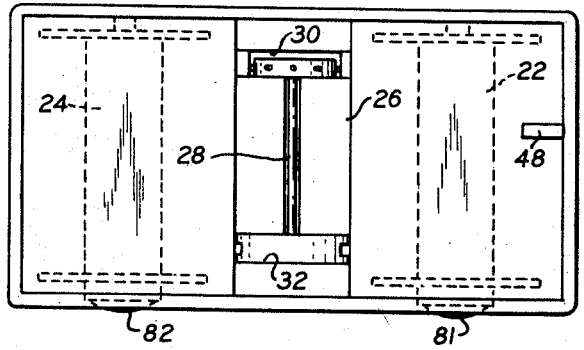
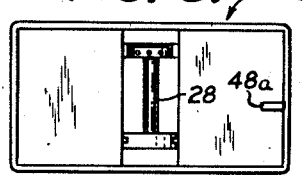
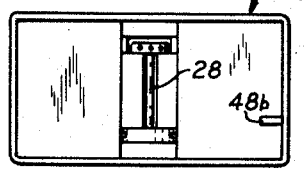
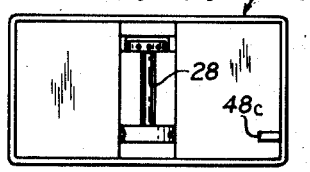
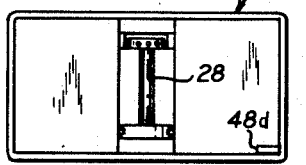
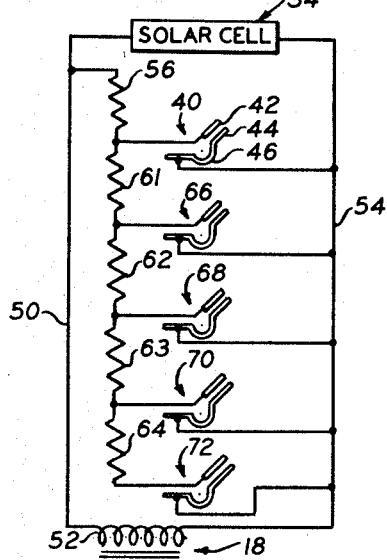
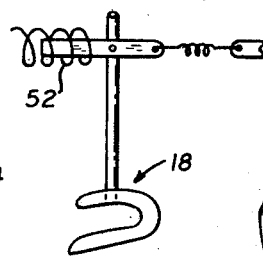
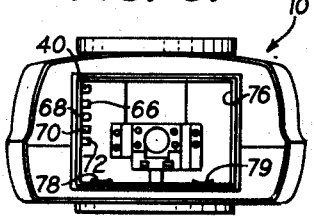
INVENTOR
Bernard S. Benson
BY Emery, Whittemore
Sandoe & Graham
ATTORNEYS.

3,194,133
AUTOMATIC IRIS CONTROL BY CAMERA FILM MAGAZINE
Bernard S. Benson, Malibu, Calif., assignor, by mesne assignments, to Bank of America National Trust and Savings Association
Filed June 27, 1962, Ser. No. 205,594
3 Claims. (Cl. 95—10)

This invention relates to cameras and more particularly to cameras having removeable magazines or casettes for holding film and each of which can be removed and replaced with another holding a film of different speed, and the invention provides improved means on the casette for regulating light responsive means of the camera in accordance with the speed of the film in each casette.

It is an object of the invention to provide an improved camera construction in which there are light responsive means for determining the proper exposure of a film in the camera, and there are a group of film casettes that fit into the housing of the camera and that have means thereon, at different positions corresponding to the speed of the film in the casette, for influencing the operation of the light responsive means.

In the preferred construction, the light responsive means includes electric circuitry with a plurality of switches, and the different casettes have abutments at different locations, corresponding to the speed of the film in the casette, for closing different parts of the electric circuitry. The circuitry preferably includes impedance units and different impedance is inserted into the active part of the circuitry depending upon which switch or switches are closed.

It is an object of the invention to provide an improved camera having an iris diaphragm and automatic light responsive means for controlling the iris diaphragm, and to change the position of the iris diaphragm for any condition of light in accordance with different film casettes that are inserted selectively into the camera and that have films of different speeds in the different casettes.

Other objects, features and advantages of the invention will appear or be pointed out as the description proceeds.

In the drawing, forming a part hereof, in which like reference characters indicate corresponding parts in all the views;

FIGURE 1 is a diagrammatic top plan view, partly broken away and in section, showing a camera equipped with a film casette and with the control means of this invention for regulating the operation of light responsive means;

FIGURE 2 is a front view of the casette shown in FIGURE 1;

FIGURES 3-6 are views, similar to FIGURE 2 but on a reduced scale, showing other casettes of a group which are intended for holding films of different speeds;

FIGURE 7 is a diagrammatic view of an iris control mechanism which may be used in the camera shown in FIGURE 1;

FIGURE 8 is a rear view of the camera shown in FIGURE 1, with the casette removed in order to show the switches that are operated by the insertion of different casettes into the camera; and FIGURE 9 is a wiring diagram for the camera shown in FIGURES 1 and 8.

The invention includes a camera 10 having a housing 11 in which there is a lens housing 14. Light enters the camera housing 11 through an opening 16 in a front wall of the housing and the light passes through the lens, which may be made up of a number of components in accordance with conventional practice.

At an intermediate location along the length of the lens housing there is an iris control device 18. At the back of the lens housing 14 there is a film casette 20 which fits into the back of the camera housing 11. In FIGURE 1 the film casette 20 is shown in full lines inserted only part way into the camera housing 11 and the position of the casette 20, when fully inserted into the housing 11, is indicated by dotted lines.

The detailed construction of the film casette 20 need not be explained for a full understanding of this invention. It is sufficient to understand that the film casette 20 includes a supply spool 22 and a take-up spool 24. Film passes from the supply spool 24 across the inside surface of a front wall of the casette, this front wall being designated by the reference character 26 in FIGURE 2 where the outside of the wall is shown. There is a slot 28 in the wall 26, and the film is exposed as it passes across the slot 28 on its way to the take-up spool 24. The camera is intended for use with film having sprocket openings on both sides and there are slots 30 and 32 extending lengthwise of the film at opposite ends of the exposure slot 28. These slots 30 and 32 provide clearance for a driving sprocket which advances the film past the slot 28 and for another sprocket which measures the amount of film used.

Considering the invention in its broader aspects, the film casette 20 is merely representative of removeable film magazines which can be inserted into a camera and removed from the camera to make way for a different magazine which is loaded with different kind of film. For example, one magazine may contain black and white film and another may contain color film. Also different magazines may be loaded with films of different speeds for use with different kinds of work.

The iris control device 18 is connected with light responsive means 34. In the preferred embodiment of the invention this light responsive means 34 is a solar cell which supplies power to operate the iris control device, the amount of power supplied being proportional to the intensity of the light which strikes the light responsive device 34.

For any given intensity of light it is desirable that the light responsive device 34 produce different effects on the iris control device 18 depending upon the speed of the film which is in the camera. Even though the light intensity is exactly the same at two different times, it is desireable to have the iris control device admit less light to the film if a faster film is in the camera. In order to obtain this control and have it dependent upon the speed of the film, means are provided by which the casette 20 controls the effect of the light responsive device 34 on the iris control device 18.

In the construction illustrated, there is a switch 40 in the circuit of the light responsive device 34. This switch 40 includes a fixed electric contact 42 and a movable electric contact 44 carried by a spring 46 which has a bias holding the contact 44 spaced from the fixed contact 42. There is an abutment 48 on the front of the casette 20 in position to touch the switch contact 44 and to push it into contact with the other switch contact 42, thus closing the circuit through the switch 40. In FIGURE 1, the casette 20 is shown in full lines in a position not fully inserted into the camera housing 11 so as to illustrate the abutment 48 spaced from the electric contact 44, and so as to show the contacts 44 and 42 in their normal spaced relation. As the film casette 20 moves from the full line position to the dotted line position, shown in FIGURE 1, the contact 48 abuts against the movable switch contact 44 and this displaces this contact 44 until it touches the contact 42, as previously explained.

FIGURE 9 is a wiring diagram showing the location of the switch 40 in the circuitry which connects the light responsive device 34 with the iris control device 18. The electric circuitry includes a conductor 50 which connects the solar cell of the light responsive device 34 directly with a coil 52 of the iris control device 18. On the other side of the coil 52 there is another conductor 54 connecting the coil directly with the solar cell. The switch 40 is connected in parallel with the coil 52 and is connected in series with an impedance unit 56, preferably a resistor.

There are other impedance units 61, 62, 63 and 64 connected in series with the impedance unit 56. Beyond the impedance unit 61, there is a switch 66 which connects the impedance unit 61 with the conductor 54. Beyond the impedance unit 62 there is another switch 68 which connects the impedance unit 62 with the conductor 54. Beyond the impedance units 63 and 64 there are other switches 70 and 72, respectively which connect these impedance units 63 and 64 with the conductor 54. The switches 66, 68, 70 and 72 are preferably of the same construction as the switch 40.

With all of the switches 40, 66, 68, 70 and 72 in their normal open position, the full voltage of the solar cell is impressed upon the coil 52 of the iris control device 18. When a casette is inserted into the camera and there is no switch operating abutment on the casette, then the iris diaphragm will be in its widest open position for any given intensity of light striking the solar cell. Thus a film casette, whch is loaded with the slowest film for which the camera is intended, will have no abutment for operating any of the switches 40, 66, 68, 70 or 72.

When the film casette 20 is inserted into the camera, and the switch 40 is closed, there is a circuit from the conductor 50 through the impedance unit 56 and through the switch 40 to the conductor 54. Since this circuit is in parallel with the coil 52, some of the current which would otherwise flow through the coil 52 is shunted through the impedance unit 56 and switch 40 and this reduces the voltage and current supplied to the iris control device 18 with the result that the iris control device requires a stronger intensity of light on the solar cell to produce the same results that were produced when the switch 40 was open.

Since the circuit through the switch 40 contains less impedance than any of the other circuits in parallel with the iris control coil 52, the casette 20 which closes the switch 40 is used for holding the fastest film for which the camera is used.

When the switch 66 is closed and all of the other switches are open, then there are two impedance units 56 and 61 in series with the switch 66 in the shunt circuit across the iris control coil 52. Similarly, when the switch 68 is closed and the other switches are open, there are three impedance units 56, 61 and 62 in series in the shunt circuit across the coil 52. When the switch 72 is closed, and all the other switches are open, then all of the impedance units 56, 61, 62, 63 and 64 are in series in the shunt circuit across the coil 52. Thus the closing of the switch 72 reduces the voltage on the coil 52 less than the closing of any of the other switches.

FIGURE 3 shows a casette 20a with an abutment 48a in position to close the switch 66 (FIGURE 9). FIGURE 4 shows a casette 20b with an abutment 48b in position to close the switch 68 (FIGURE 9). FIGURE 5 shows a casette 20c with an abutment 48c in position to close the switch 70 (FIGURE 9); and FIGURE 6 shows a casette 20d with an abutment 48d in position to close the switch 72 (FIGURE 9).

FIGURE 8 is a rear view of the camera shown in FIGURE 1 and illustrates an opening 76 into which the casette 20 or the other casettes 20a–d are inserted. This view also shows the locations of the switches 40, 66, 68, 70 and 72 in a vertical line near one side of the opening 76 and in the path of the various abutments 48, etc., of the various casettes.

FIGURE 8 also shows sockets 78 and 79 at the lower part of the opening 76 and in position to receive rounded lower ends 81 and 82 at the lower end of the spools 22 and 24. These spools 22 and 24 are yieldable in a vertical direction so that the rounded ends 81 and 82 can be displaced upwardly far enough to slide into the rounded depressions 78 and 79 (FIGURE 8) and to engage these depressions in the manner of ball detents. This detent action causes the spool ends 81 and 82 to act as retaining means for holding the casette in the camera. But the casette can be withdrawn any time by merely exerting sufficient pull on it to displace the rounded ends 81 and 82 from the depressions 78 and 79. These depressions 78 and 79 are in portions of the camera which can be used for rotating the spool and in the preferred construction the recess or depression which is engaged by the takeup spool is constructed to provide a jaw clutch for driving the take-up spool but this forms no part of the present invention.

Again considering the invention in its broadest aspects, the light responsive device 34 and the iris control device 18 may be considered as representative of means for determining the correct exposure for film in the camera, and instead of controlling the iris diaphragm, such means may control a shutter speed or may merely indicate to the user of the camera the exposure conditions that should be followed in operating the camera under any condition of light intensity.

The camera illustrated in FIGURES 1 and 8 is a panoramic camera and is constructed so as to rotate about a vertical axis through a principal point of the lens. This means that the image at the focal plane of the camera remains stationary in space as the camera moves angularly about its axis of rotation. The film, which is also at the focal plane, can remain stationary in space as the casette 20 moves as a unit with the camera housing 11 and causes the exposure slot 28 (FIGURE 2) to travel across the film. Such a camera does not require a shutter and the space between successive pictures will be an exposed area of film having the width of the slot 28. The exposure time when the camera is taking a picture depends upon the rate of angular movement of the camera and upon the width of the slot 28.

This invention is not limited to panoramic cameras, however, and it can be used with other cameras which have magazines or casettes and which have shutters for controlling the exposure of the film.

The preferred embodiment of the invention has been illustrated and described, but changes and modifications can be made, and some features can be used in different combinations without departing from the invention as defined in the claims.

What is claimed is:

1. A camera including a housing having a space therein, light-responsive means in the housing for determining proper exposure of a film in the camera, the light-responsive means including different electric circuits for changing the operation of said light-responsive means and including also a plurality of switches in the circuits and at spaced locations at one side of said space in the housing, a group of film magazines that fit into the housing and into the back of said space within the housing and that are selectively inserted in the housing to change the film in the camera, each film magazine having film spool housings at opposite sides thereof and a rearwardly recessed front wall between the housings and with an exposure slot therein for exposing a film that is drawn across the back of said recessed front wall, and an abutment surface on the film spool housing on one side of each of the magazines, location of the abutment surfaces of the different magazines corresponding with the location of different ones of the spaced switches, which switches close the circuits that adjust the camera for the particular film speeds of the films in the different magazines.

2. The camera described in claim 1 characterized by impedances in the different electric circuits, the switch means being correlated with the different electric circuits to introduce different impedance into the circuit of the light-responsive means upon selective operation of the different switches.

3. The camera described in claim 1 characterized by light-responsive means including an energy-generating element exposed to the light to be evaluated and an iris-operating device connected to the energy-generating element, different impedances in the different electric circuits, the different switches being in position to cut the impedences out of the circuit of the energy-generating device when there is no magazine in the camera and to introduce the different impedances into the circuit of the energy-generating element to vary the voltage available to the iris-operating device in accordance with the position of the abutment on the particular magazine that is inserted into the camera.

References Cited by the Examiner

UNITED STATES PATENTS

| | | | |
|---|---|---|---|
| 2,080,055 | 5/37 | Martin | 95—10 X |
| 2,493,928 | 1/50 | Rath | 95—10 |
| 3,025,777 | 3/62 | Wilkenson | 95—10 |
| 3,083,626 | 4/63 | Nerwin | 95—10 |

EVON C. BLUNK, *Primary Examiner.*